United States Patent [19]

Sjolund

[11] 4,450,353
[45] May 22, 1984

[54] TILT DETECTOR WITH PYRAMIDAL SURFACE

[75] Inventor: John R. Sjolund, Arden Hills, Minn.

[73] Assignee: Sundstrand Corporation, Rockford, Ill.

[21] Appl. No.: 299,910

[22] Filed: Sep. 8, 1981

[51] Int. Cl.³ .......................... G01D 5/34; G01C 9/06
[52] U.S. Cl. .................................... 250/231 R; 33/366
[58] Field of Search ............ 250/231 R; 33/365, 366; 340/689; 200/61.45 R, 61.52

[56] References Cited

U.S. PATENT DOCUMENTS

| | | | |
|---|---|---|---|
| 2,303,360 | 12/1942 | Irwin et al. | 200/61.52 |
| 2,540,974 | 2/1951 | Warren | 200/61.52 |
| 3,097,565 | 7/1963 | Kupelian | 33/366 X |
| 3,630,168 | 12/1971 | Findlay | 200/61.45 R X |

Primary Examiner—F. L. Evans
Attorney, Agent, or Firm—Ted E. Killingsworth; Michael B. McMurry; Harold A. Williamson

[57] ABSTRACT

A tilt detecting device having an optical axis extending from a light source to a light responsive device, a spherical opaque body, and a basin, generally symmetrical about the axis and having a concave bottom configured as the surfaces of planes intersecting along lines passing through a common point on the axis, for supporting the body for rolling movement generally transverse to the axis.

7 Claims, 2 Drawing Figures

TILT DETECTOR WITH PYRAMIDAL SURFACE

TECHNICAL FIELD

The invention relates to the fields of optics and machine design.

BACKGROUND OF THE INVENTION

The present invention comprises an improvement on the invention disclosed in the co-pending application of Amos and Burns, Ser. No. 136183, filed Mar. 31, 1980 and assigned to the assignee of the present application, now abandoned.

As pointed out in the co-pending application, the operation of farm and construction machinery on hills or inclines is potentially hazardous because such vehicles may be tilted to the point where the critical roll angle of the vehicle is exceeded, causing the vehicle to tip and roll, possible to the injury of the operator. Thus, there is a need for a warning system which will provide an alarm or other indication when the vehicle approaches this critical roll angle, and systems have been devised for operating an indicating or warning device when the machine is tilted either on a hillside or incline to a point where it might tip and begin to roll.

A prior art tilt detecting device which can be used in such prior art systems incorporates a bubble level where the bubble normally allows light from a light source to fall upon a photosensor. As the detecting device is tilted, however, the bubble is shifted to a point where it no longer allows light to travel from the source to the photosensor, and the de-energization of the photosensor can be used to energize an indication device, to give warning that the housing of the tilt detecting device has been tilted too much. The problem with such a device is that tilt responsive switches must operate under wide variations in ambient temperature conditions. Since the bubble is established in a fluid, the fluid expands and contracts as the ambient temperature changes. As this fluid expands and contracts, the bubble also expands and contracts, which results in significant changes in the angles to which this type of tilt responsive device is responsive.

Other forms of prior art tilt detecting devices include pendulums where the pendulum bob forms one contact and the housing of the pendulum tilt detecting device forms the other contact, so that if the device is tilted sufficiently, gravity operates the pendulum until it comes in contact with the housing, thus closing the circuit to an alarm or indicator. A similar type of device uses a ball which rolls in a housing as the housing is tilted until it comes into contact with a flat circular contact within the housing to establish a circuit between the housing and the contact for energizing an alarm or warning device. Both this ball tilt detecting device and the pendulum device require an adequate force between the pendulum or ball and the housing or the contact to guarantee reliable sensing. For small tilt angles, such as 0.5 degrees or less, the ball or the pendulum do not apply adequate force to guarantee a reliable contact. If a damping fluid such as silicone oil is used in the device to damp out vibrations, as is typical with almost all tilt detecting devices, the problem is worse because the surface tension of the oil inhibits low resistance contacts and causes significant mechanical hysteresis or sticking.

In the co-pending application there is provided a housing having a basin with a concave surface on which an opaque ball is free to roll transversely to the optical axis from a light source to a light sensor. When the detector is level the ball blocks light from the source from reaching the sensor, but it unblocks the light when the detector is tilted by more than a predetermined amount. The movement of the ball is damped by a transparent silicone liquid, so that its position relative to the axis is generally proportional to the tilt of the detector in a small angular range, regardless of the direction of the tilt.

Many applications for tilt detectors are such that a greater tilt can be tolerated in one direction rather than in another-greater longitudinally then transversely, for example. Moreover, there is no need for a structure where the ball position is proportional to the tilt at low angles.

BRIEF SUMMARY OF THE INVENTION

The present invention comprises a tilt detector in which the basin is modified by giving its concave surface a pyramidal configuration, that of the surfaces of planes intersecting along lines passing through a common point on the optical axis. Since the lines are straight, any tilt sufficient to cause movement of the ball from its axis causes it to continue to move completely off the axis, so that the passage of light, from source to sensor, is either totally enabled or totally impeded. The lines define mutually perpendicular planes passing through the optical axis, in which planes the lines make different angles with the axis so that the detector is more sensitive to tilt in one plane than in another.

Various advantages and features of novelty which characterize the invention are pointed out with particularity in the claims annexed hereto and forming a part hereof. However, for a better understanding of the invention, its advantages, and objects obtained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify similar parts throughout.

DESCRIPTION OF THE PREFERRED EMBODIMENT

Figure 1:
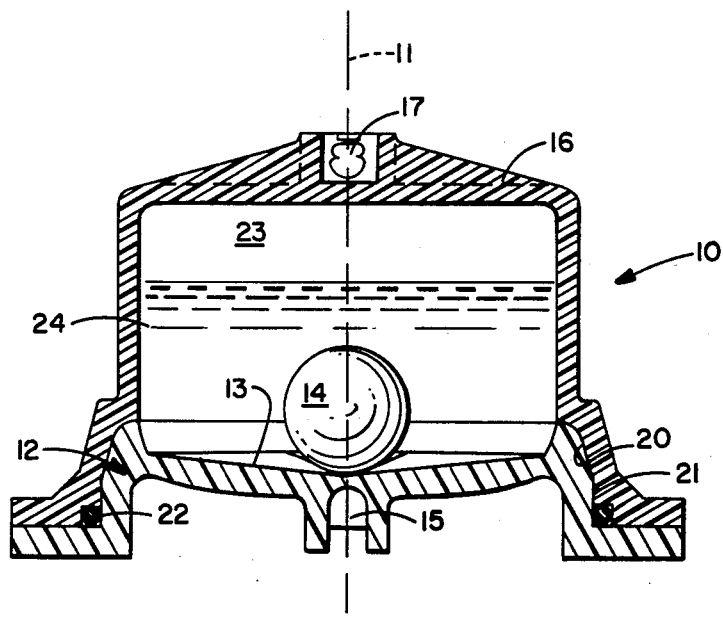
FIG. 1 is a fragmentary showing of a detector according to the invention in axial section and, FIG. 2 is a plan view of a basin used in the detector.

A detector 10 according to the invention is generally symmetrical about a normally vertical axis 11, and comprises a basin 12 having a generally horizontal concave surface 13 on which a rigid opaque ball 14 may roll generally transversely of axis 11, as the device is tilted. A light sensor 15 such as a photo transistor is mounted axially below surface 13, of which at least the axial portion is transparent.

Coaxial with basin 12 is a lampholder 16 in which there is axially mounted a light source 17 which may be a lamp or a light emitting diode: at least the axial portion of lampholder 16 is also transparent. Lampholder 16 has a shoulder 20 for engaging a shoulder 21 of basin 12, to which it may be assembled in any suitable fashion, including an O ring 22 if this is desired. Basin 12 and lampholder 16 jointly define a chamber 23 enclosing ball 14, which moves in a damping silicone liquid 24.

As previously mentioned, surface 13 is not curvilinear, but is configured as a plurality of planes intersecting along lines which themselves intersect at a point of axis 11.

Figure 2:
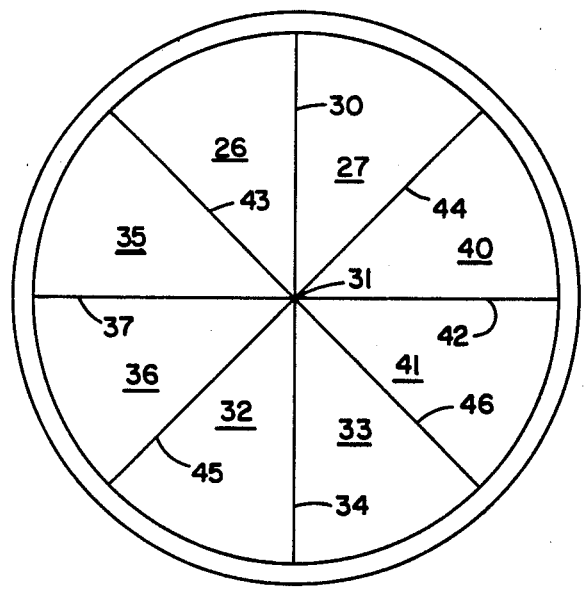

Thus in FIG. 2 planes 26 and 27 intersect at a line 30 which passes through point 31 on axis 11, and planes 32 and 33 intersect along line 34 which also passes through point 31. Lines 30 and 34 define a first, "longitudinal" plane containing the axis 11. Similarly, planes 35 and 36 intersect along line 37 and planes 40 and 41 intersect at a line 42: lines 37 and 42 pass through point 31, and define a second, "transverse" plane containing axis 31 and perpendicular to the first plane. The first named angles made with axis 11 by lines 30 and 34 are equal: the second named angles made with axis 11 by lines 37 and 42 are also equal, but need not be the same as the first angles: indeed, if the sensitivity of the device is to be different, the first named angles must be different from the second named angles. In one successful embodiment of the invention, these angles were 84.5 degrees and 87.5 degrees.

Planes 26 and 35 intersect along a line 43, planes 27 and 40 along a line 44, planes 32 and 36 along a line 45, and planes 33 and 41 along a line 46. In the embodiment referred to above, lines 43–46 made angles of 85.4 degrees at axis 11.

In use, detector 10 is mounted on a machine whose attitude is to be monitored, with axis 11 vertical when the machine is level, and with the "transverse" plane containing lines 37 and 42 extending crosswise of the machine. Electrical energy is supplied to light source 17, and a suitable indicator is connected to sensor 15: one suitable indicator is shown in the copending application referred to above.

As long as the detector is level, ball 14 occludes sensor 15 from receiving light from source 17. If the detector is tilted by more than 2.5° laterally, ball 14 rolls along of one of lines 37 and 42 to the edge of the basin, enabling light from source 17 to reach sensor 15 and giving a tilt indication. Likewise, if the detector is tilted by more than 5.5° longitudinally, ball 14 rolls along one of lines 30 and 34, clearing the optical axis again and giving an indication of tilt. When the device returns within the angular limits, the ball returns to the axis and the indication of tilt is completely interrupted.

From the foregoing it will be evident that the invention comprises a tilt indicator, having different sensitivities in two orthogonal directions, in which an opaque body fully interrupts or fully enables passage of light from a source to a sensor.

Numerous characteristics and advantages of the invention have been set forth in the foregoing description, together with the details of the structure and function of the invention, and the novel features thereof are pointed out in the appended claims. The disclosure, however, is illustrative only, and changes may be made in detail, especially in matters of shape, size, and the arrangement of parts, within the principle of the invention, to the full extent indicated by the broad general meaning of the terms in which the appended claims are expressed.

I claim:

1. A tilt detecting device adapted for use in an application where greater tilt can be tolerated in one direction than in another direction and including a light source, a light responsive device, a spherical opaque body, and means supporting said body for rolling movement transverse to an axis extending between said source and said device in response to tilting of said housing away from a position in which said body is on said axis and occludes said light responsive device from said source, said supporting means comprising a concave basin generally symmetrical about said axis and having a bottom configured as the surfaces of planes intersecting along lines passing through a common point on said axis in which a first pair of said lines defines a first plane and a second pair of said lines defines a second plane perpendicular to said first plane and wherein said second pair of said lines intersects said axis at angles greater than the angles at which said first pair of said lines intersects said axis.

2. A device according to claim 1 in which the angles between the axis and the lines of each pair are equal.

3. A device according to claim 2 in which said angles are about 84 degrees and about 87 degrees respectively.

4. A device according to claim 1 in which said basin is transparent at least in an area at said axis.

5. In a tilt detecting device adapted for use in an application where greater tilt can be tolerated in one direction than in another direction and including a ball supporting surface comprising a generally concave basin generally symmetrical about an axis and having a bottom configured as the surfaces of planes intersecting along lines passing through a common point on said axis, a first pair of said lines intersecting at said point to define a first plane and a second pair of said lines intersecting at said point to define a second plane perpendicular to said first plane, the lines of second pair making greater angles with said axis than do the lines of said first pair.

6. An apparatus according to claim 5 in which said bottom is transparent at least in an area around said axis.

7. Apparatus according to claim 6 in which said basin includes means for supporting a light sensitive device axially below said bottom.

* * * * *